US012692846B2

(12) United States Patent
Roach

(10) Patent No.: US 12,692,846 B2
(45) Date of Patent: Jul. 28, 2026

(54) GRAVITY BATTERY MOTOR AND ENERGY STORAGE SYSTEM

(71) Applicant: Anthony Roach, Ozark, MO (US)

(72) Inventor: Anthony Roach, Ozark, MO (US)

( * ) Notice: Subject to any disclaimer, the term of this patent is extended or adjusted under 35 U.S.C. 154(b) by 43 days.

(21) Appl. No.: 18/915,319

(22) Filed: Oct. 14, 2024

(65) Prior Publication Data

US 2025/0035091 A1 Jan. 30, 2025

Related U.S. Application Data

(63) Continuation-in-part of application No. 18/485,256, filed on Oct. 11, 2023, now abandoned.

(60) Provisional application No. 63/475,691, filed on Dec. 6, 2022.

(51) Int. Cl.
*F03G 3/08* (2006.01)
*F03G 3/00* (2006.01)

(52) U.S. Cl.
CPC .............. *F03G 3/094* (2021.08); *F03G 3/08* (2013.01)

(58) Field of Classification Search
CPC ... F03G 3/08; F03G 3/094; F03G 7/10; F03G 7/104; F03G 7/115
See application file for complete search history.

(56) References Cited

U.S. PATENT DOCUMENTS

2018/0166946 A1 * 6/2018 Walsh ...................... H02K 7/09

FOREIGN PATENT DOCUMENTS

| | | | | | |
|---|---|---|---|---|---|
| FR | 2651279 | A1 | * | 3/1991 | .............. F03G 7/115 |
| GB | 2438416 | A | * | 11/2007 | ........... H02K 7/1853 |
| KR | 20200024261 | A | * | 3/2020 | ............... H02K 7/02 |
| WO | WO-8400052 | A1 | * | 1/1984 | ........... H02K 7/1853 |
| WO | WO-2016011610 | A1 | * | 1/2016 | ............. F03G 7/107 |
| WO | WO-2017152295 | A1 | * | 9/2017 | ............... F03G 7/10 |
| WO | WO-2019164386 | A1 | * | 8/2019 | ............... F03G 3/08 |

* cited by examiner

*Primary Examiner* — Phillip A Johnson
(74) *Attorney, Agent, or Firm* — Sam Pierce

(57) ABSTRACT

The present invention relates to a gravity-based energy storage and conversion system that harnesses gravitational force, mechanical leverage, and kinetic energy to efficiently store and release energy. The system comprises a central power output drive shaft, a flywheel assembly, a motorized belt drive system, and a series of mass-affixed leverage arms. Energy is generated by lifting a mass within the system to a higher potential energy state using a pulley mechanism. The energy is then released by allowing the mass to descend under gravity, generating rotational torque that drives the flywheel, which in turn powers an electricity generator. The invention provides a scalable and environmentally friendly solution for energy storage, making it ideal for integration with renewable energy sources.

9 Claims, 7 Drawing Sheets

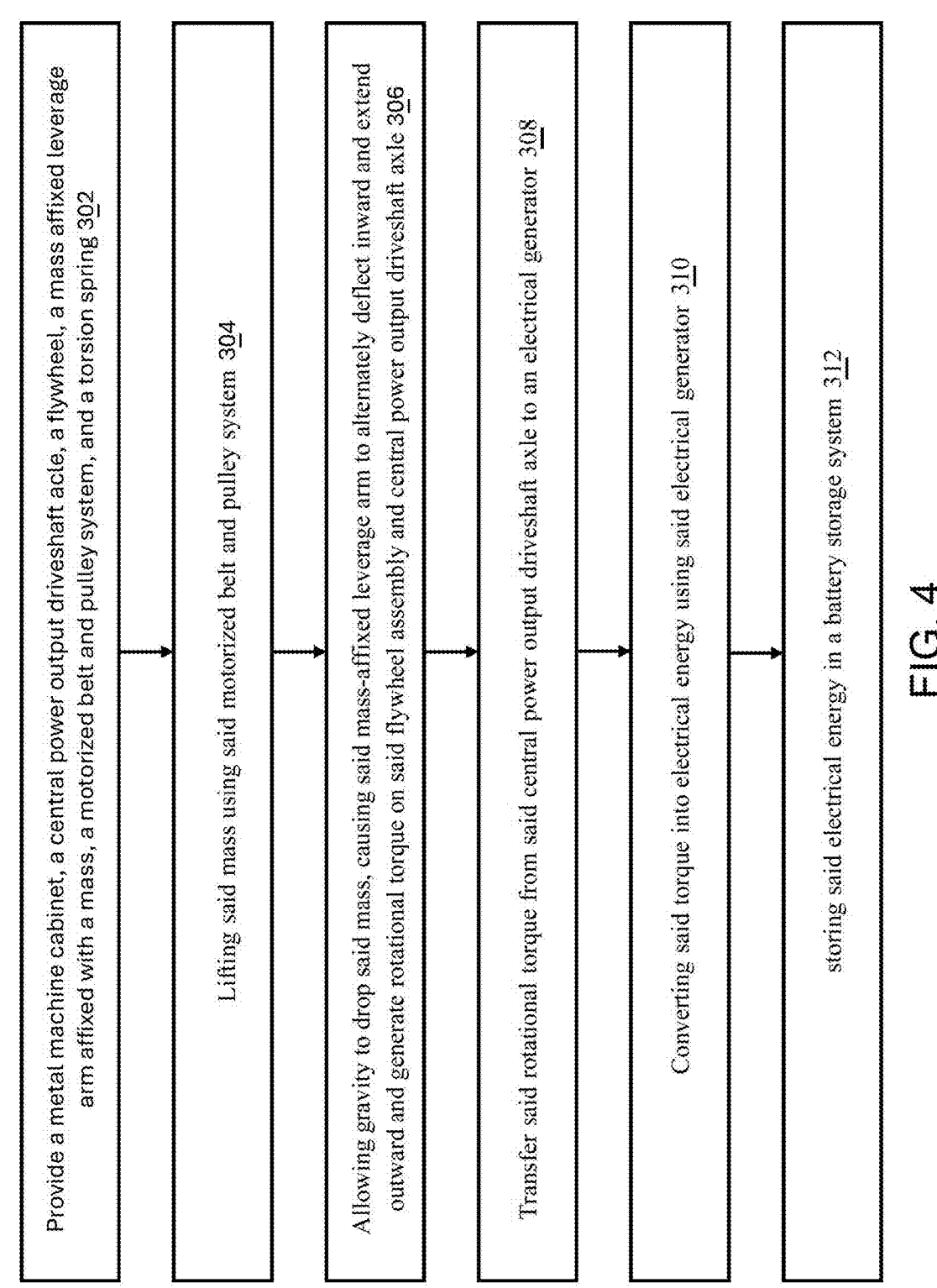

300

Provide a metal machine cabinet, a central power output driveshaft acle, a flywheel, a mass affixed leverage arm affixed with a mass, a motorized belt and pulley system, and a torsion spring 302

Lifting said mass using said motorized belt and pulley system 304

Allowing gravity to drop said mass, causing said mass-affixed leverage arm to alternately deflect inward and extend outward and generate rotational torque on said flywheel assembly and central power output driveshaft axle 306

Transfer said rotational torque from said central power output driveshaft axle to an electrical generator 308

Converting said torque into electrical energy using said electrical generator 310 storing said electrical energy in a battery storage system 312

FIG. 4

GRAVITY BATTERY MOTOR AND ENERGY STORAGE SYSTEM

TECHNICAL FIELD

The present invention relates generally to energy storage systems and mechanical power generation, and more specifically to a system and method for storing energy.

BACKGROUND

The global energy landscape is undergoing a significant transformation, driven by the need for sustainable and environmentally friendly power generation solutions. As the world shifts away from fossil fuels, there is an increasing emphasis on alternative energy sources such as solar, wind, and hydroelectric power. These renewable energy sources are not only cleaner but also offer a virtually unlimited supply of energy. However, the intermittent nature of these energy sources presents a challenge, as they do not always generate power when demand is high. To address this issue, energy storage systems have become an essential component of modern power grids, enabling the storage of excess energy generated during periods of low demand and its release during peak consumption.

Current energy storage technologies include a range of approaches, each with its own set of advantages and drawbacks. Battery storage systems, such as lithium-ion and lead-acid batteries, offer the advantage of being deployable in a variety of settings, from residential to industrial. However, they are hampered by high costs, safety concerns, and degradation over time, leading to a reduction in storage capacity and efficiency.

Mechanical energy storage systems, such as flywheels, compressed air energy storage (CAES), and pumped hydro storage, provide alternative methods for storing energy. Flywheels offer rapid response times and high power density but are limited by their energy storage capacity and the complexity of maintaining a vacuum environment for high-efficiency operation. CAES systems can store large amounts of energy, but their reliance on underground caverns or other large-scale infrastructures limits their applicability. Pumped hydro storage, while highly efficient and capable of storing vast amounts of energy, is geographically constrained and requires significant capital investment. In addition to these, gravitational energy storage systems have been explored as a means of harnessing the potential energy of elevated masses. These systems use gravitational forces to store energy by raising a mass and releasing it to generate electricity. However, existing gravitational energy storage solutions tend to be complex, costly, and often limited by the need for precise control mechanisms to manage the energy release efficiently.

Thus, solutions have been proposed for storing excess electrical energy using gravitational energy. US20160084236 describes a Gravity Field Energy Storage & Recovery System invention, which is a mechanical, electrical and electronic system that has the ability to harness any electrical or mechanical power source and allow it to do work to configure a mechanical system into a state of high potential energy, using a high mass object in a gravitational field. The charging cycle consists of repositioning a massive object in a gravity field to a position of higher potential energy. The potential energy can be stored without loss for extended periods of time. The potential energy stored in the invention can be recovered on demand. The energy recovery mode consists of releasing the massive object in the gravity field in a controlled fall, producing a kinetic energy which can then be transformed into a usable form of energy such as electricity, pneumatic, or hydraulic power.

U.S. Pat. No. 3,857,242 discloses a motor operating under the principles of both gravity and buoyancy comprises a vertically disposed conveyor having brackets thereon for the reception of hollow, closed tanks moved onto each bracket from the upper portion of the conveyor. As the tanks fall under their own weight, the conveyor rotates a power output shaft connected thereto. Each tank is moved off their brackets when reaching a lower portion of the conveyor, after which they are each moved into the bottom of a liquid filled receptacle having a vertically disposed conveyor located therein. The tanks are directed beneath brackets on this conveyor and, as the tanks are buoyed upward by the liquid, the conveyor rotates another power output shaft connected thereto. Both power output shafts may be interconnected for combining the total power output of both the gravity and buoyancy portions of the motor.

Despite the variety of existing energy storage solutions, there remains a significant gap in the market for a system that combines high efficiency, scalability, low environmental impact, and cost-effectiveness. Existing technologies either lack the ability to store large amounts of energy without significant losses or are prohibitively expensive and challenging to deploy on a wide scale. Additionally, many current solutions are not easily adaptable to different environments or energy demands, limiting their utility in addressing the diverse needs of a modern power grid.

There is a need for an innovative energy storage system that can leverage natural forces, such as gravity, in a simplified and reliable manner, while minimizing the complexity and costs associated with current technologies. Such a system should be capable of integrating with existing renewable energy infrastructures, offering a scalable solution that can be deployed in a variety of settings without requiring significant geographical or infrastructural prerequisites. The present invention seeks to address these needs by providing a novel approach to energy storage that overcomes the limitations of existing technologies, offering a more efficient, sustainable, and adaptable solution for the future of energy storage.

BRIEF SUMMARY OF THE INVENTION

A system for storing energy is disclosed. The system includes a metal machine cabinet housing various components. At the core is a central power output driveshaft axle. A flywheel assembly is mounted on this axle and is connected to a mass-affixed leverage arm and bracket system. The leverage arm has a prescribed mass at its distal end. The system also includes a motorized belt and pulley system, which lifts the mass affixed to the leverage arm, causing gravitational forces to descent the mass to drive the rotation of the flywheel assembly. The system features a torsion spring that stores and releases strain energy as the leverage arm moves in response to these forces. As the mass descends due to gravity, the flywheel rotates, causing the mass-affixed leverage arm to alternately deflect inward and extend outward. This motion generates torque, which is transferred to the central power output driveshaft axle.

A method of energy storage is disclosed. The method may include providing a metal machine cabinet, a central power output driveshaft axle, a flywheel, a mass affixed leverage arm, a motorized belt and pulley system, and a torsion spring. The method may further include rotating said flywheel using said motorized belt and pulley system. The method may further include causing said mass affixed leverage arm to alternately deflect inward and extend outward during rotation, generating torque on said central power output driveshaft axle. The method may further include transferring said torque from said central power output driveshaft axle to an electrical generator. The method may further include converting said torque into electrical energy using said electrical generator. The method may further include storing said electrical energy in a battery storage system.

An objective of the present invention is to develop a system that efficiently stores excess energy generated from renewable sources, such as solar and wind, using gravitational and mechanical principles, ensuring energy availability during periods of high demand. Another objective of the present invention is that this system can be integrated into existing setups through aftermarket solutions, thereby enhancing versatility and usability across various applications.

Another objective of the present invention is to improve the conversion of stored potential energy into usable electrical energy with minimal losses, utilizing a combination of gravitational force, kinetic energy, and mechanical leverage.

Another objective of the present invention is to provide a gravity-driven energy storage system that leverages mechanical advantage principles to optimize energy conversion. The system comprises a mass that is directed in a controlled rotational path using a belt and pulley system, which is connected to a motorized drive. The mass is attached to a solid leverage arm bracket, which enhances the applied force through mechanical advantage. Elastic strain energy is stored in coiled and torsion springs during the upward motion of the mass and is released to contribute to the rotation of a flywheel. The flywheel stores rotational kinetic energy, which can be used to drive an output generator or alternator.

The system utilizes centripetal force to direct the mass inward as it rotates, compressing a coiled spring and storing energy. Once the mass reaches a certain height, centrifugal force takes over, driving the mass outward and increasing the system's moment of inertia. This motion releases the stored elastic strain energy, which, combined with the amplified torque generated by the leverage arm, rotates the flywheel. The rotational energy stored in the flywheel is then transferred to an output driveshaft, which powers an attached generator or alternator.

Another objective of the present invention is to create a modular and scalable design that can be adapted to various sizes and energy requirements, making it suitable for residential, commercial, and industrial applications.

Another objective of the present invention is to minimize the environmental footprint by using clean, renewable energy sources and reducing reliance on chemical batteries, thereby eliminating issues related to battery disposal and degradation.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4 is a flowchart of a method for storing energy in accordance with an illustrative embodiment.

DETAILED DESCRIPTION OF THE DRAWINGS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present invention generally relates to a method and system for storing energy.

Figure 1:
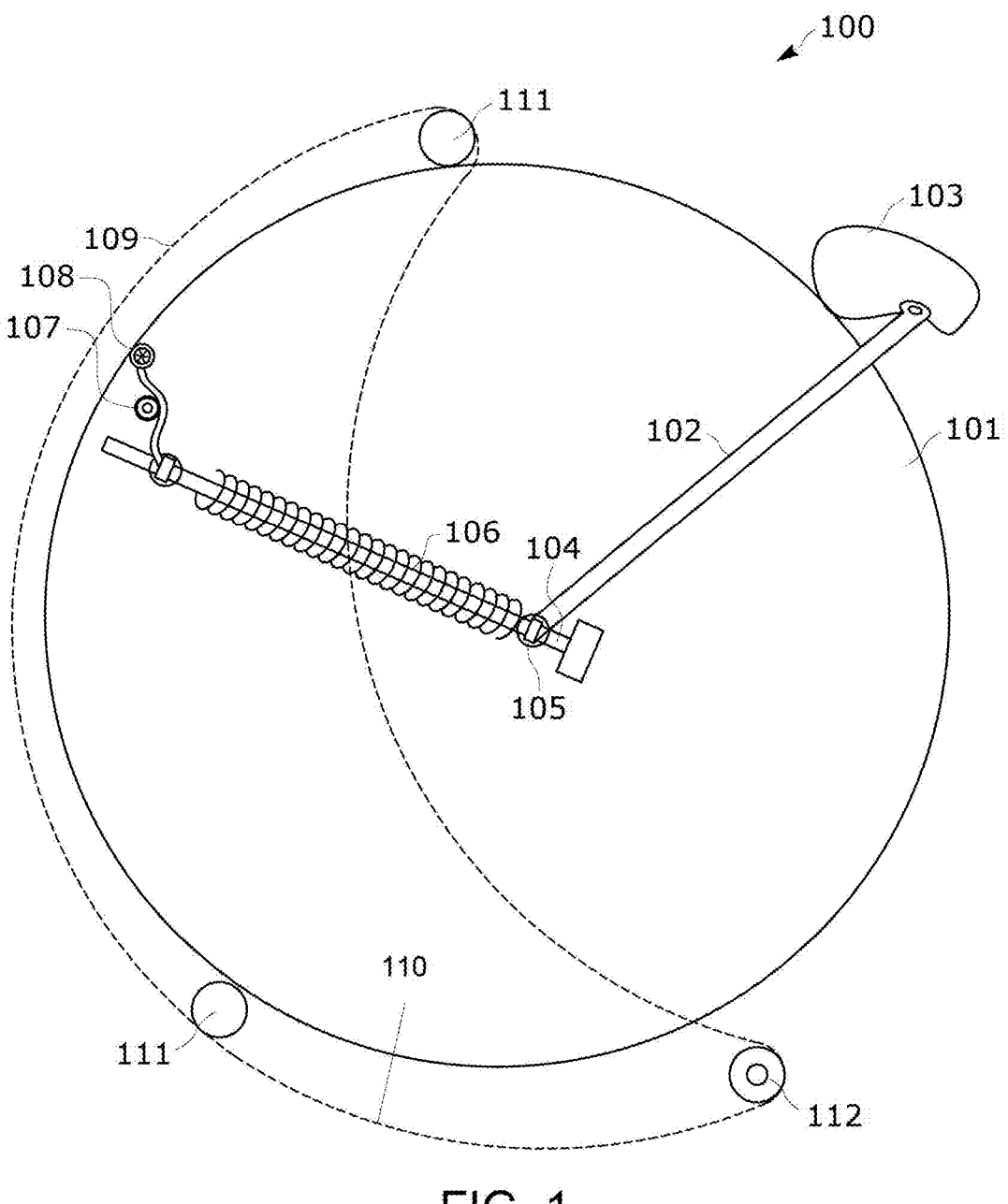
FIG. 1 illustrates a flywheel assembly with the mass in the extended state, dropping into a rotational full torque centrifugal alignment position, in accordance with an illustrative embodiment.

FIG. 1 illustrates a flywheel assembly 100 in accordance with an illustrative embodiment. The figure illustrates a flywheel assembly 100, which is a critical component of the energy storage and conversion system. The flywheel assembly 100 is designed to store kinetic energy and release it to generate rotational torque, which can be used to drive an electricity generator.

The central component of the flywheel assembly 100 is the flywheel 101, a large, circular disk typically made of a high-density material such as steel or composite alloys. The flywheel 101 is mounted horizontally and is designed to rotate around a central axis. The mass and diameter of the flywheel 101 are chosen to maximize its moment of inertia, allowing it to store significant kinetic energy when spun at high speeds.

The flywheel 101 is securely mounted on a central drive shaft (not shown), which is also the main drive shaft of the system. This central drive shaft extends horizontally through the center of the flywheel 101 and is connected to the power output system. The rotational motion of the flywheel 101 around the central drive shaft generates the torque necessary for energy conversion. The central drive shaft is supported by bearings at both the top and bottom, ensuring smooth and stable rotation with minimal friction.

The flywheel assembly comprises a leverage arm 102 which extend radially outwards from the center. The leverage arm 102 is provided with mass 103 on its one end. The leverage arm 102 along with mass 103 contribute to the flywheel's overall moment of inertia, enhancing its ability to store energy. The second end of the leverage arm is slidably and pivotally provided on a glide rod 104. A swivel mounts 105 is provided on the second end of the leverage arm 102 which slides on the glide rod 104 and provide sliding and pivoting motion to the leverage arm 102. A coiled spring 106 is also provided on the glide rod 104. The coiled spring 106 is used to store the potential energy and release it to rotate the flywheel 101 (Explained later). A torsion spring 107 is provided on the other end of the glide rod 104. One end of the torsion spring 107 is connected to the glide rod 104 and the other end is fixedly connected to the hub 108 which is fixedly mounted the flywheel 101.

A motorized belt pulley system 109 comprises a belt 110, pulleys 111, and electric braking electric drum motor 112. The motorized belt system 109 within the flywheel assembly 100 controls the lifting of mass 103 via the pulley 111. The motorized belt pulley system 109 is powered by motor with low power outputs.

Figure 2:
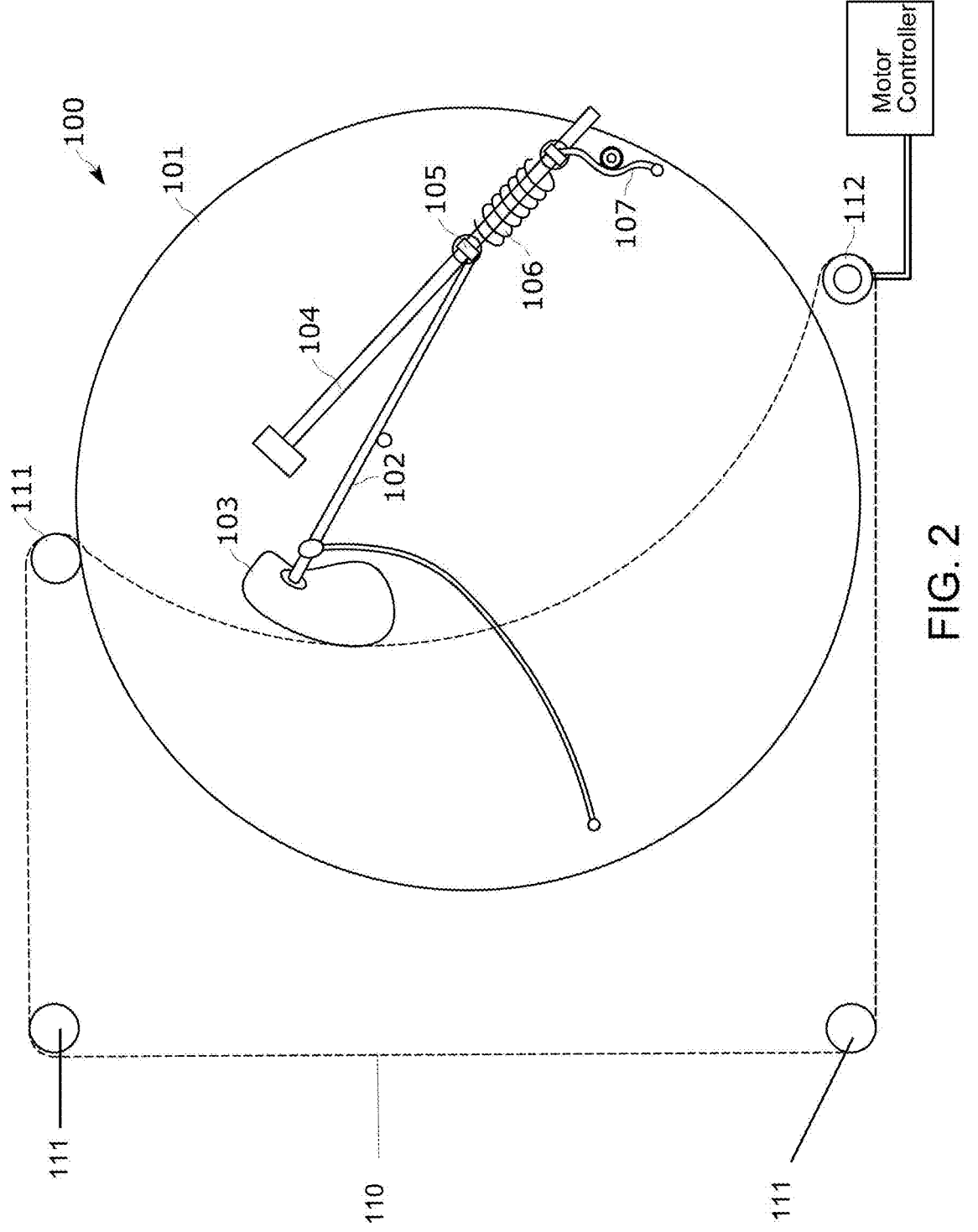
FIG. 2 illustrates a flywheel assembly with the mass being compressed in the rising translational belt-driven position, under the influence of centripetal alignment force, in accordance with an illustrative embodiment.

Now with reference to FIG. 1 and FIG. 2, the working of the current invention will be explained.

The motorized belt system within the flywheel assembly 100 controls the lifting of mass 104 via the pulley 107. The motorized belt system lifts the masses 103 upward translationally, causing centripetal force to act on the mass 103 and leverage arm 102, leading to the rotation of the flywheel 101. When the mass 103 is displaced upward translationally the leverage arm 102 slides along the glide rod 104 which results in compression of the coiled spring 106 resulting in storage of elastic strain energy.

The centripetal force plays a crucial role in guiding the mass 103 as it moves along its circular path around the axis of rotation, which is connected to the flywheel 101. This force, provided by the belt and pulley system 109 is essential for keeping the mass 101 on its curved trajectory, preventing it from flying off in a straight line due to inertia. As the mass is pulled inward by the centripetal force, it moves closer to the axis of rotation, decreasing its radius of rotation. This inward motion increases the mass's rotational speed due to the conservation of angular momentum, where a decrease in radius typically results in an increase in angular velocity if no external torque is applied.

The increase in the mass's speed translates to a rise in its kinetic energy, which is then transferred to the flywheel 101. The flywheel 101, which stores this energy as rotational kinetic energy, is directly influenced by the controlled motion of the mass. The belt and pulley system 109 ensures that the centripetal force is applied efficiently, allowing the mass 103 to contribute maximally to the flywheel's rotation. This process enhances the overall efficiency of the energy transfer within the system. Without the centripetal force to guide the mass 103 inward, the energy transfers to the flywheel 101 would be less effective, leading to reduced rotational speed and energy storage in the flywheel 101.

After the mass 103 in the system reaches its threshold height, the dynamics of the system shift as the mass begins to fall due to gravity. At this point, two critical forces come into play: the release of energy from the compressed coiled spring 106 and the action of centrifugal force as the mass moves outward during its descent.

Firstly, as the mass 103 is lifted to its threshold height, the coiled spring 106 becomes compressed, storing significant elastic strain energy. This stored energy represents potential energy accumulated during the upward movement of the mass. When the mass reaches its peak and gravity pulls it downward, the coiled spring 106 releases this stored energy.

The release of energy from the coiled spring provides a powerful force that directly contributes to the rotation of the flywheel 101. This energy release assists in accelerating the mass as it moves downward, enhancing the kinetic energy transferred to the flywheel 101. The transfer of this energy is crucial for maintaining the momentum of the flywheel 101, ensuring that the system continues to efficiently store rotational kinetic energy.

Simultaneously, as the mass 103 falls, it moves outward from the axis of rotation due to the action of centrifugal force. This outward movement increases the radius of rotation, which in turn increases the system's moment of inertia. Centrifugal force pushes the mass away from the center of rotation, and as this occurs, the rotational speed of the mass may decrease due to the conservation of angular momentum. However, the increased radius, coupled with the energy released by the coiled spring 106, generates additional torque that is applied to the flywheel. The combination of these forces ensures that, despite the outward movement and the increase in moment of inertia, the system effectively transfers energy to the flywheel, maintaining its motion.

The interplay between the energy released from the coiled spring 106 and the centrifugal force as the mass 103 moves outward is essential for optimizing the system's energy conversion process. The spring's energy release counteracts any potential loss in rotational speed due to the increased radius, while the centrifugal force ensures that the mass moves in a controlled, efficient manner. Together, these forces enable the system to continue generating rotational kinetic energy, which is stored in the flywheel and can be used for generating electricity or other forms of power.

Due to the movement of the leverage arm 102 with the mass 103 along the glide rod 104, which causes the torsion spring 107 connected to the glide rod to twist, thereby storing elastic strain energy. As the mass 103 moves, either being lifted by the belt and pulley system or falling due to gravity, the torsion spring accumulates potential energy as it resists the twisting force generated by the mass's motion.

The other end of the torsion spring 107 is fixedly connected to the hub 108, which is securely mounted on the flywheel 101. This connection is essential because it ensures that when the torsion spring begins to release its stored energy, the energy is directly transferred to the flywheel. As the mass 103 reaches its threshold height and begins to fall, the torsion spring 107 unwinds, releasing the stored energy. This release generates a rotational force on the hub, which in turn drives the rotation of the flywheel.

The rotational energy imparted to the flywheel 101 by the unwinding torsion spring increases the flywheel's rotational kinetic energy, which is then stored for later use.

The flywheel assembly 100 is supported by a robust guide rail and support structure, which ensures the stability of the flywheel 102 during operation. The guide rails (not shown) are positioned around the perimeter of the flywheel 100 and are designed to keep the mass-affixed leverage arm 102 aligned during rotation. The support structure is typically made of a strong metal frame, providing the necessary rigidity and durability to withstand the forces generated during the flywheel's high-speed operation.

An energy transfer mechanism (shown in FIG. 3) is connected to the central drive shaft (shown in FIG. 3) and is responsible for transferring the rotational torque generated by the flywheel 102 to the electricity generator or other power conversion devices. This mechanism may include additional gears, pulleys, or a direct coupling to an alternator, depending on the specific application and design of the energy storage system.

The entire flywheel assembly 100 is enclosed within a protective flywheel housing (not shown), which serves multiple purposes. It protects the moving components from external contaminants, reduces noise during operation, and ensures safety by containing the flywheel 102 in the event of mechanical failure. The housing (not shown) is typically equipped with access panels (not shown) for maintenance and inspection.

An electronic control system interface (not shown) is connected to the motorized belt drive system and the energy transfer mechanism. This interface allows operators to monitor and adjust the flywheel's operation, including its rotational speed, energy storage capacity, and energy release timing. The control system is crucial for optimizing the performance of the flywheel assembly 100 and ensuring efficient energy management.

Figure 3:
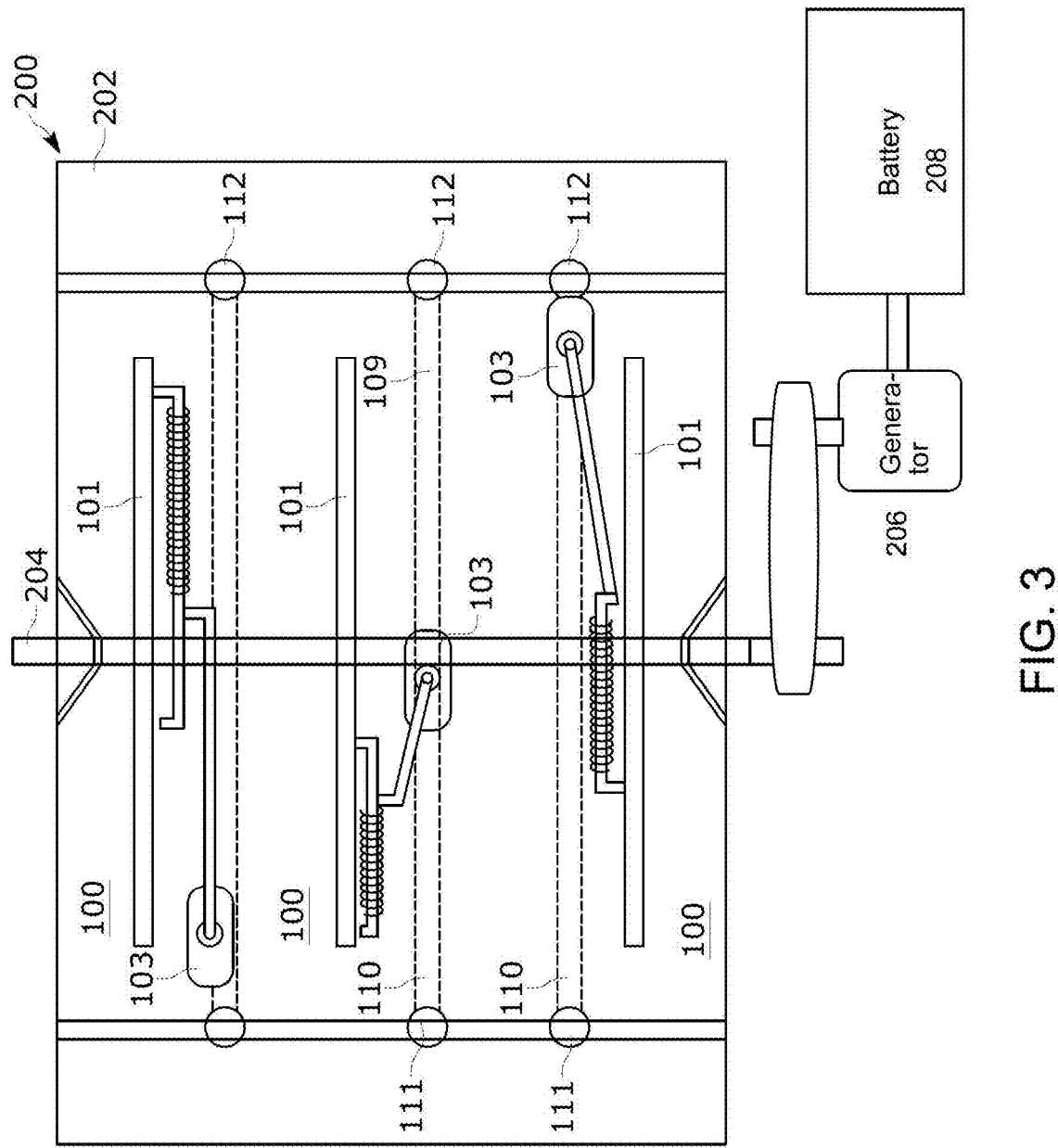
FIG. 3 illustrates a cross sectional view of a system for storing energy in accordance with an illustrative embodiment.

FIG. 3 illustrates a system 200 for producing and storing energy in accordance with an illustrative embodiment. The figure illustrates a comprehensive system 200 for producing and storing energy, utilizing the flywheel assembly 100. This system 200 integrates various mechanical and electrical components designed to harness gravitational forces and convert them into usable electrical energy.

The system 200 is housed within a sturdy metal machine cabinet 202, which provides structural support and protection for the internal components. The cabinet 202 is designed to withstand environmental factors and mechanical stresses, ensuring the durability and longevity of the system 200. The cabinet 202 also includes access panels (not shown) for maintenance and inspection of internal components.

At the core of the system 200 is the central power output driveshaft axle 204, which serves as the primary axis around which the flywheel assembly 100 and other rotating components operate. The central power output driveshaft axle 204 is precisely machined to ensure smooth and efficient rotation, and it is supported by high-quality bearings (not shown) that minimize friction and wear during operation.

The flywheel assembly 100 is mounted on the central power output driveshaft axle 204. This assembly includes a large, circular flywheel 101 designed to store kinetic energy as it rotates. The flywheel 101 is constructed from a high-density material, allowing it to accumulate significant rotational inertia. The rotational energy stored in the flywheel 101 is a key source of power for the system 200.

Connected to the flywheel assembly 100 is the mass-affixed leverage arm 102. This system 200 includes leverage arms 102 that extend radially from the centre of the flywheel 101, each arm 102 having a prescribed mass 103 affixed to its distal end. A motorized belt and pulley system 109 is operatively connected to the flywheel assembly 100. This motorized belt and pulley system 109 includes a belt 110 that loops around pulleys 111 connected to a driveshaft axle 206 and a braking electric drum motor 112. The motorized belt system 109 is responsible for initiating and controlling the rotation of the flywheel assembly 100. The motorized belt and pulley system 109 provides precise control over the flywheel's speed and torque output. The motorized belt and pulley system 109 is powered by electric drum motor 112. The pulley 110 lifts the mass 103 upward translationally, and when released, gravity causes the mass 103 to extend further and begin its downward rotational movement. As the masses 103 drop, they generate additional torque as they move downward, which is transferred to the flywheel 101 thereby rotating it.

The system incorporates a torsion spring 107 configured to store and release strain energy. The torsion spring 107 is connected to the glide rod 104 and is designed to be compressed as the mass 104 drop and rotate the flywheel 101. As the mass-affixed leverage arm 102 move downward and extend outward, the stored strain energy in the torsion spring 107 is released, contributing additional torque to the flywheel assembly 100 and enhancing the overall efficiency of the system 200.

The system 200 includes an integrated variable speed motor controller (not shown), which is operatively connected to the motorized belt and pulley system. This motor controller is responsible for regulating the rotational speed of the flywheel assembly 100, ensuring optimal performance under different operational conditions. The controller allows for adjustments in real-time, responding to changes in load demand or input power availability.

An electrical generator 206 is connected to the central power output driveshaft axle 204. This generator 206 converts the rotational energy from the flywheel assembly 100 into electrical energy and store in battery 208. The generator 206 is designed to operate efficiently at the varying speeds and torques produced by the system, ensuring consistent power output for downstream applications.

The movement of the mass-affixed leverage arms 103 is guided by a track or rail system (not shown) located within the metal machine cabinet 202. This track or rail system is designed to control the path of the mass-affixed leverage arm 102 as they move inward and outward in response to motion of the mass 104. The system 200 ensures that the mass-affixed leverage arms 102 follow a precise and controlled trajectory.

The system 200 is further equipped with a battery storage system 208 that is electrically connected to the electrical generator 206. This battery system 208 stores the electrical energy, providing a reservoir of energy that can be used when direct generation is not possible or to smooth out fluctuations in power output. The battery storage system is designed for scalability, allowing for adjustments in storage capacity based on the specific energy requirements of the installation.

During operation, the motorized belt and pulley system 109 initiates the rotation of the flywheel assembly 100, which in turn causes the mass-affixed leverage arms 102 to move in a controlled inward and outward pattern. The movement of the mass-affixed leverage arms 102, influenced by gravitational forces, generates rotational torque that is applied to the central power output driveshaft axle 204. This torque is transferred to the electrical generator, which converts it into electrical energy. The system's design allows for efficient energy storage and release, with the integrated variable speed motor controller and the torsion spring 107 further enhancing performance.

FIG. 4 is a flowchart 300 of a method for storing energy in accordance with an illustrative embodiment. The flowchart illustrates the step-by-step process for storing energy using a system 200 that includes a flywheel assembly 100 and a mass-affixed leverage arm 102 with mass 103. The process is divided into sequential steps, each contributing to the efficient storage of energy.

At step 302, the process begins by providing the necessary components of the system 200, including a metal machine cabinet 202, a central power output driveshaft axle 204, a flywheel 101, a mass-affixed leverage arm 102 with a mass 103 at its distal end, a motorized belt and pulley system comprising a belt 110 and a pulley 111, a coiled spring 106, and a torsion spring 107. These components are essential for the subsequent steps in the method 300.

At step 304, once the system components are in place, the motorized belt and pulley system 109 is engaged. This system uses the belt 110 and the pulley 111 to lift the mass 103 affixed to the leverage arm 102. As the belt lifts the mass vertically, it creates a centripetal force that guides the mass along a circular trajectory, initiating the energy storage process.

The descent of the mass compresses the coiled spring 106 on the glide rod 104, storing elastic strain energy. Simultaneously, as the mass moves inward due to centripetal force, its rotational speed increases, transferring kinetic energy to the flywheel 101.

At step 306, as the mass 103 falls, it moves outward due to centrifugal force, increasing the system's moment of inertia. The combination of centrifugal force and the release of energy from the coiled spring 106 generates additional torque on the central power output driveshaft axle 204. The torsion spring 107, connected to the glide rod 104 and the hub 108 on the flywheel, also unwinds, releasing stored energy that further drives the rotation of the flywheel 101.

At step 308, the generated torque on the central power output driveshaft axle 204 is transferred to an electrical generator (not shown). The central power output driveshaft axle 204, connected to the generator, drives its mechanical components, converting the rotational kinetic energy into mechanical energy.

At step 310, the electrical generator converts the mechanical energy received from the central power output driveshaft axle 204 into electrical energy. This conversion process involves the interaction of the generator's internal components, such as the rotor and stator, which work together to produce an electrical current.

At step 312, the final step in the method involves storing the electrical energy in a battery storage system. The electrical output from the generator is fed into the battery system, where it is stored for later use. This storage system ensures that the energy can be efficiently managed and utilized as needed.

The described system 300 leverages gravitational force, strain energy, and kinetic energy to create a highly efficient conversion process. By using a flywheel assembly 100 in combination with a mass-affixed leverage arm 103 and a torsion spring 107, the system 200 minimizes energy losses and maximizes the amount of energy that can be stored and later converted into electricity.

The system 300 utilizes a relatively simple yet robust design, with fewer moving parts and a reliance on well-understood mechanical principles like leverage, rotation, and strain energy storage. This simplicity reduces the likelihood of mechanical failure and extends the operational lifespan of the system 300.

The system 300 is designed with modularity in mind, allowing multiple units to be connected in series or parallel to meet varying energy needs. This scalability makes the system 300 adaptable to a wide range of applications, from small-scale installations to large energy grids.

While the system 300 can be integrated with external power sources, it is primarily designed to harness gravitational and mechanical forces internally, reducing dependency on external inputs. This makes the system more reliable and self-sufficient, particularly in environments where consistent external power sources are not available.

The system's use of a flywheel 101 and energy storage through strain and gravitational forces allows it to provide a continuous energy supply, even during periods when external power generation is low or absent. This continuous operation capability is particularly beneficial in ensuring a stable energy output.

Figure 5:
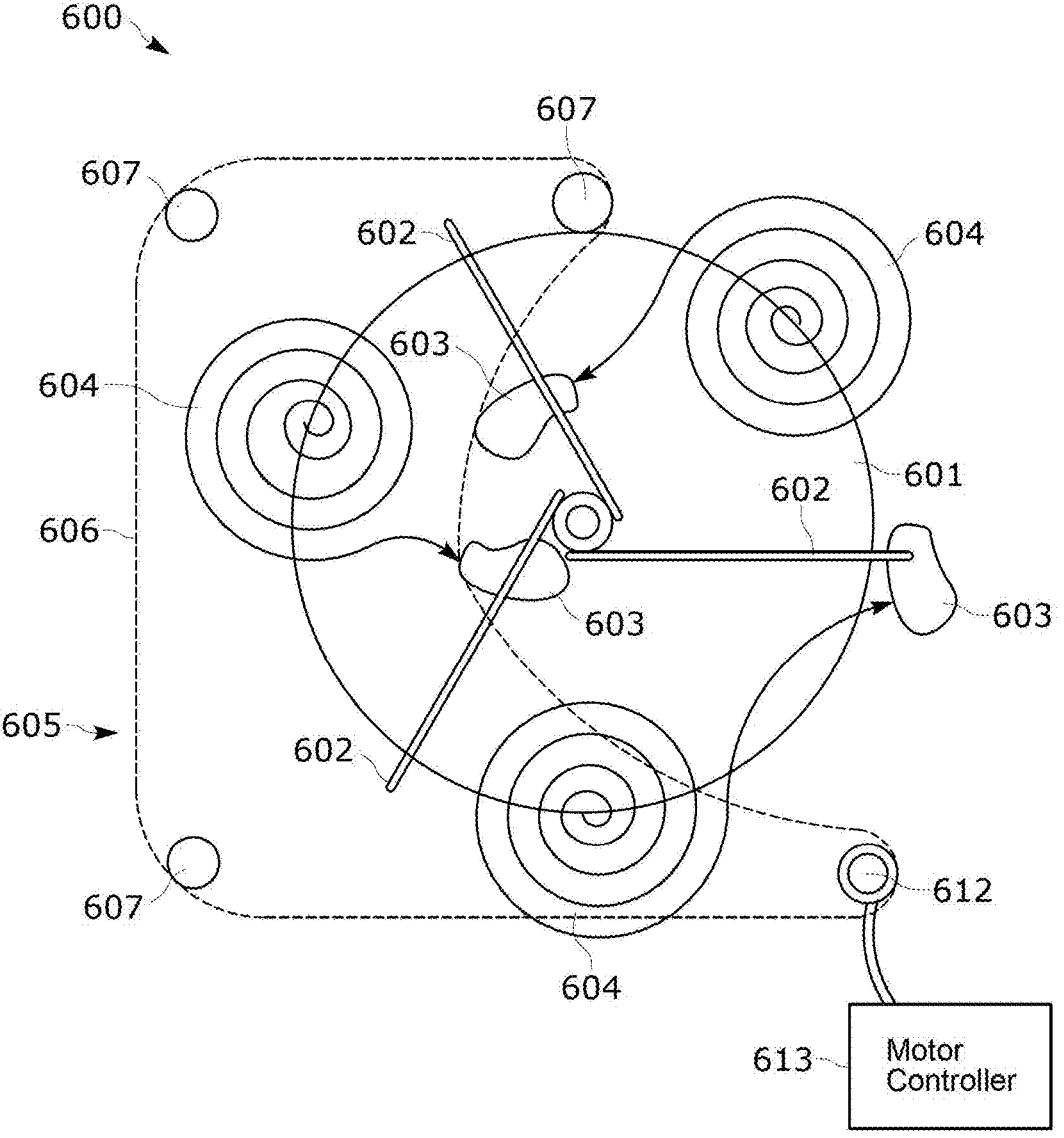
FIG. 5 illustrates a side view of the flywheel assembly in accordance with a second embodiment.

Now from FIG. 5-7, second embodiment of the current invention will be explained.

The present invention discloses an energy storage and conversion system 600 utilizing a flywheel assembly 601. The system involves three rods 602, each positioned 120 degrees apart around the flywheel 601. A mass 603 is provided on each rod 602, with the mass 603 configured to slide up and down along the length of the rod 602. The mass 603 is connected to a spiral spring 604, which controls the sliding movement along the rod 602. The system 600 is designed to harness gravitational, centrifugal, and centripetal forces, along with the mechanical leverage of the masses, to rotate the flywheel and store energy.

The system 600 includes a motorized belt and pulley system 605 that lifts the masses 603 to a predetermined height, increasing their potential energy. The belt 606, driven by a motor, engages with the masses 603 and raises them along the rods 602. As the masses 603 are lifted, centripetal force begins acting on the masses due to the rotation of the flywheel 601, causing the masses 603 to move inward along the rods. This inward movement of the masses 603 contributes to the rotation of the flywheel 601, enhancing its stored kinetic energy. The centripetal force is essential for maintaining the controlled movement of the masses 603 toward the center of the flywheel 601, ensuring efficient energy transfer to the flywheel 601 during the lifting process.

When the mass 603 reaches a predetermined height, the motorized belt and pulley system 605 disengages, and the mass 603 begins its descent. At this point, a compressed spiral spring 604 attached to the mass is triggered, pushing the mass 603 outward along the rod 602. This outward movement is driven by the release of stored elastic strain energy in the spiral spring 604. As the mass 603 moves outward, centrifugal force takes over, pushing the mass 603 further away from the center of the flywheel 601.

The outward movement of the mass 603 due to the centrifugal force increases the system's 600 moment of inertia and consequently increases the rotational speed of the flywheel 601. The centrifugal force ensures that as the mass 603 moves outward along its radial path, more energy is transferred to the flywheel 601, boosting its speed and energy storage capacity.

Figure 6:
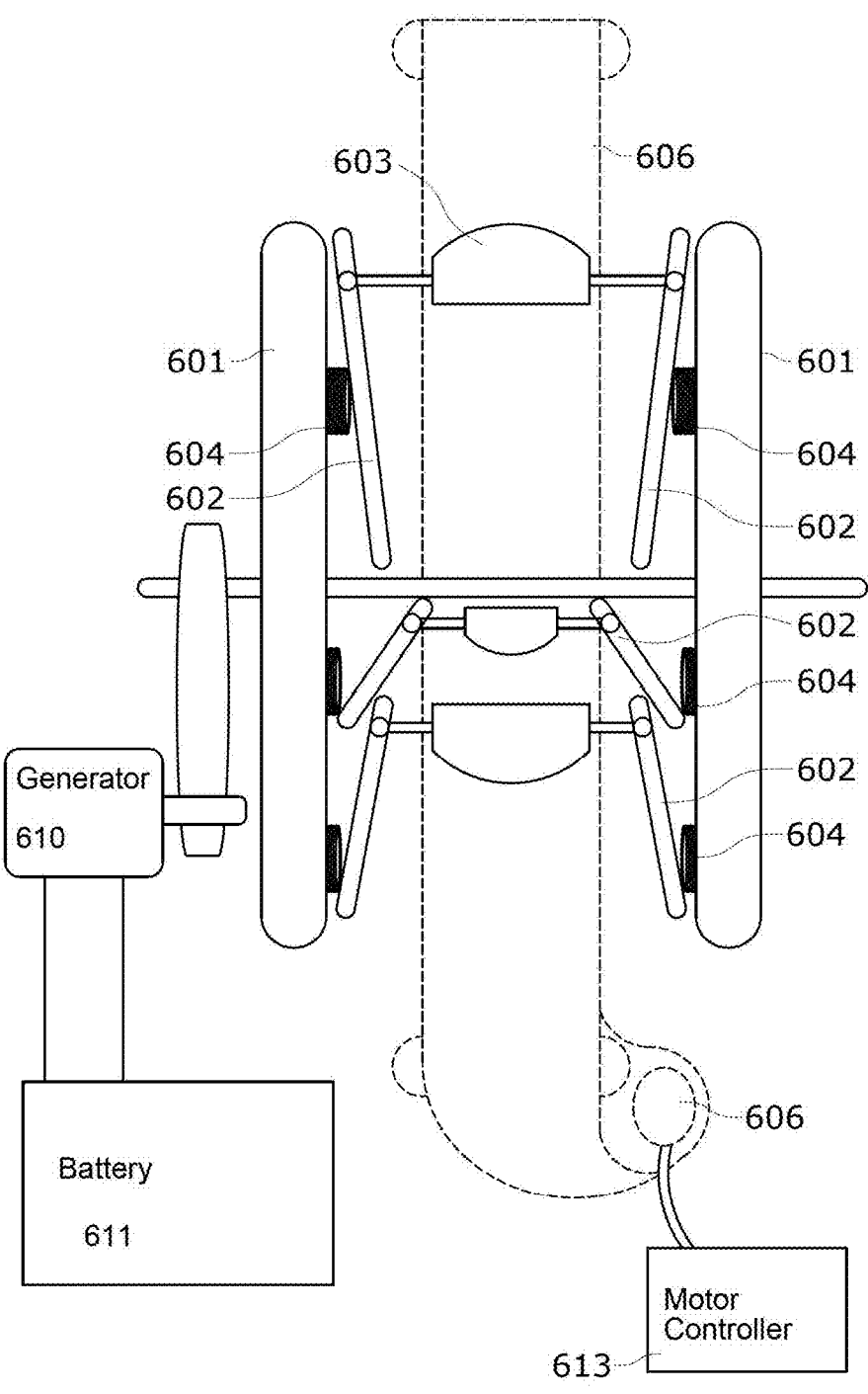
FIG. 6 illustrates a front view of the flywheel assembly in accordance with the second embodiment.

As shown in FIG. 6, the system 600 incorporates a mirrored configuration of the rods 602 and masses 603, ensuring that all three masses 603 are lifted and released simultaneously using a single belt and pulley system 605. This synchronized movement ensures that the system 600 remains balanced and operates efficiently, with minimal mechanical losses. The spiral spring 604 attached to each mass 603 helps control the speed of the outward movement, ensuring smooth and controlled energy transfer to the flywheel 601.

As the masses 603 reach their maximum outward position on the rods 602, the system 600 harnesses both centripetal and centrifugal forces to drive the rotation of the flywheel 601. The interaction of these forces, along with the stored energy from the spiral springs 604, results in a continuous and efficient rotation of the flywheel 601, which stores kinetic energy that can later be converted into usable power.

The synchronized operation of the masses 603, controlled by the belt and pulley system 605, and the interplay of centripetal and centrifugal forces ensure that the system operates with high efficiency. The ability to lift and release all three masses simultaneously optimizes energy transfer and increases the overall rotational speed of the flywheel 601.

An integrated variable speed motor controller 613 regulates the operation of the motorized belt and pulley system 605, by controlling the speed of braking electric drum motor 612 ensuring precise control over the lifting speed and timing of the masses 603. The motor controller 613 allows for fine adjustments to optimize the system's 600 performance in real-time, taking into account operational conditions. Sensors and control circuits continuously monitor the position of the masses 603 and the rotational speed of the flywheel 601, enabling automated adjustments for maintaining optimal performance. These automated controls ensure the system can operate efficiently and reliably, adapting to varying loads or energy demands.

To enhance safety and prevent mechanical failures, the system 600 incorporates multiple protective features. A braking system is provided to slow or stop the flywheel 601 in case of emergencies or excessive rotational speeds, ensuring safe operation. Additionally, limit switches (not shown) are installed along the rods 602 to prevent the masses 603 from exceeding their intended range of motion. These limit switches ensure the masses stop at the correct points to avoid mechanical strain or damage. Together, these safety features ensure the system 600 operates smoothly and safely, reducing the risk of mechanical failure and enhancing the longevity of the components.

The operation sequence of the system begins with the motorized belt and pulley system 605 engaging to lift the masses 603 inward along the rods 602 towards the flywheel's 601 center, against the force of the compressed spiral springs 604. As the masses move inward, centripetal force causes the flywheel 601 to rotate due to the torque applied by the shifting masses 603. Once the masses 603 reach a predetermined height, they are disengaged from the belt, and the compressed spiral springs 604 are triggered, pushing the masses 603 outward. This outward motion rapidly increases the masses' radial distance from the center, where centrifugal force further accelerates the flywheel 601, contributing additional torque and increasing its rotational speed. The stored kinetic energy in the flywheel 601 is then transferred via the central power output driveshaft axle 602 to an electrical generator 610, converting the rotational energy into electrical energy, which is stored in the battery system 611 or supplied directly to end-users.

The system presents numerous advantages, including high efficiency, achieved by leveraging both centripetal and centrifugal forces, along with the energy stored in the compressed spiral springs 604, allowing for minimal energy losses. The system's simplicity is reflected in its use of a single motorized belt and pulley system 605 to manage all the masses 603, reducing mechanical complexity and maintenance. Furthermore, the system's scalability allows for easy adjustments in the size of the masses, the flywheel 601, and the number of rods 602, making it adaptable to a wide range of applications. The system's reliability is enhanced by its mirrored configuration and the integrated safety features, ensuring balanced operation and a long operational lifespan.

Figure 7:
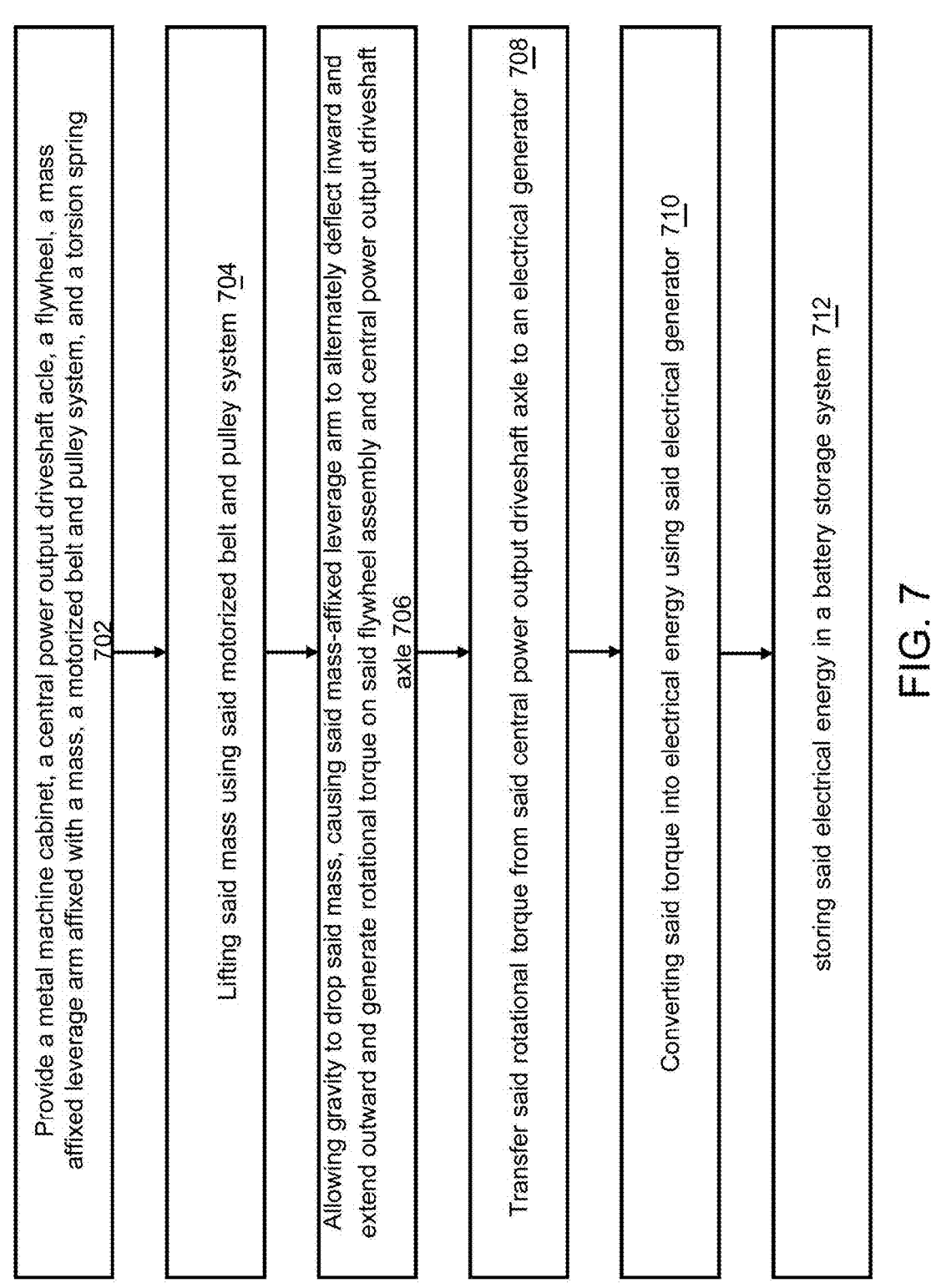
FIG. 7 is a flowchart of a method for storing energy in accordance with the second embodiment.

FIG. 7 is a flowchart 700 of a method for storing energy in accordance with an illustrative embodiment. The flowchart illustrates the step-by-step process for storing energy using a system 200 that includes a flywheel assembly 601 with masses 603 mounted on rods 602 and controlled by a motorized belt and pulley system 605. Each step contributes to the efficient storage of energy.

At step 702, the process begins by providing the necessary components of the system 600, including the flywheel assembly 601, a motorized belt and pulley system 605, rods 602 with masses 603, spiral springs 604, and an integrated variable speed motor controller 613. These components are essential for lifting the masses and controlling their movement along the rods, which harnesses centripetal and centrifugal forces to rotate the flywheel.

At step 704, the motorized belt and pulley system 605 is engaged to lift the masses 603 upward along the rods 602. As the belt lifts the masses to the predetermined height, centripetal force begins to act on the masses, pulling them inward and causing the flywheel 601 to rotate. This initial rotation stores kinetic energy in the flywheel as the masses move toward the flywheel's center.

When the masses reach the top position, the motorized belt 606 disengages, and the spiral springs 604, which have been compressed during the lifting process, are triggered. The release of the spiral springs 604 pushes the masses outward along the rods, converting stored potential energy into outward motion. Centrifugal force then takes over, increasing the rotational speed of the flywheel 601 as the masses move outward, contributing additional torque to the system.

At step 706, as the masses 603 move outward, the system's moment of inertia increases, boosting the flywheel's rotational speed. The combination of centrifugal force and the energy released by the spiral springs 604 ensures that the flywheel reaches a high-speed state, maximizing the amount of energy stored.

At step 708, the rotational energy stored in the flywheel 601 is transferred through the central power output driveshaft axle 602 to an electrical generator 610. This generator converts the kinetic energy of the flywheel into mechanical energy, which is subsequently converted into electrical energy.

At step 710, the electrical generator 610 converts the mechanical energy into electrical energy through the interaction of the generator's internal components. This energy can be immediately used or stored in an integrated battery system 611 for future use.

At step 712, the electrical energy is stored in the battery system 611, ensuring that the energy can be efficiently utilized later. The stored energy can be used when there is a need for power, or when external energy generation is insufficient.

The system 600 leverages centripetal and centrifugal forces, along with the mechanical energy stored in the spiral springs 604, to create a highly efficient energy storage and conversion process. By using the rotational kinetic energy stored in the flywheel 601, the system minimizes energy losses and maximizes the amount of energy that can be stored and converted into electricity.

The system 600 is designed with simplicity in mind, reducing mechanical complexity by using a single motorized belt and pulley system 605 to manage all masses 603, making it more reliable and easier to maintain. This design minimizes the likelihood of mechanical failure, ensuring a long operational lifespan.

The system 600 is scalable, allowing for adjustments to the size of the masses 603, the flywheel 601, and the number of rods 602. This scalability makes the system adaptable to a wide range of applications, from small installations to large industrial grids.

While the system can integrate external power sources, it primarily operates using gravitational and mechanical forces, reducing dependency on external inputs. This feature makes the system more reliable and self-sufficient, particularly in environments where consistent external power sources may not be available.

Embodiments of the present invention pertain to systems for energy production and storage. Notably, this system can be integrated into existing setups through aftermarket solutions, enhancing versatility and usability across various applications.

The system's use of centripetal and centrifugal forces, along with the stored energy in the spiral springs 604, ensures available energy even during periods when external power is unavailable. The system is designed to provide stable and reliable energy output, making it particularly suitable for modern energy storage needs.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing drawings have been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that an article, or apparatus that comprises a list of elements does not include only those elements but may include other elements not expressly listed or inherent to such process, article, or apparatus. An element proceeded by "a" or "an" does not, without further constraints, preclude the existence of additional identical elements in the process, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the detailed description, with each claim standing on its own as a separately claimed subject matter.

What is claimed is:

1. A system for conversion of stored potential energy, comprising:

a metal machine cabinet;

a central power output driveshaft axle;

a flywheel assembly comprising a flywheel mounted on said driveshaft axle;

an affixed leverage arm operatively connected to said flywheel assembly, wherein a weight is affixed to a distal end of the leverage arm;

a motorized belt and pulley system configured to lift said weight, wherein said weight descends under a gravitational force to rotate said flywheel and apply rotational torque to said central power output driveshaft axle; and a torsion spring configured to store and release strain energy as said leverage arm moves in response to said gravitational forces, wherein rotational movement of said leverage arm during lifting and descending of the weight generates torque that is transferred to said central power output driveshaft axle.

2. The system of claim 1, further comprising an integrated variable speed motor controller operatively connected to said motorized belt and pulley system, wherein said motor controller regulates operation of the pulley to lift said weight and control the rotational speed of said flywheel assembly.

3. The system of claim 1, further comprising an electrical generator connected to said central power output driveshaft axle, wherein said electrical generator is configured to convert the rotational energy generated by the lifting and falling of said weight into electrical energy.

4. The system of claim 1, wherein said affixed leverage arm is guided by a track or rail system within said metal machine cabinet, and wherein said track or rail system being configured to control the movement of said leverage arm during rotation of said flywheel assembly.

5. The system of claim 1, further comprising a battery storage system electrically connected to said electrical generator for storing electrical energy generated by said generator.

6. A method of conversion of stored potential energy, the method comprising:

provising a metal machine cabinet, a central power output driveshaft axle, a flywheel, an affixed leverage arm affixed with a weight, a motorized belt and pulley system, and a torsion spring;

lifting said weight using said motorized belt and pulley system;

allowing said weight to descend under a gravitation force, causing said affixed leverage arm to alternately deflect inward and extend outward and generate rotational torque on said flywheel assembly and central power output driveshaft axle;

transferring said rotational torque from said central power output driveshaft axle to an electrical generator;

converting said torque into electrical energy using said electrical generator; and storing said electrical energy in a battery storage system.

7. The method of claim 6, further comprising regulating the operation of the pulley to lift said weight and control the rotational speed of said flywheel assembly using an integrated variable speed motor controller.

8. The method of claim 6, further comprising the step of transmitting the stored electrical energy from said battery storage system to an electrical grid via an electrical grid interface.

9. The method of claim 6, further comprising the step of optimizing the energy output by adjusting the position of said affixed leverage arm during the rotation of said flywheel assembly.

* * * * *